(12) United States Patent
Huang et al.

(10) Patent No.: US 8,933,748 B1
(45) Date of Patent: Jan. 13, 2015

(54) ACTIVE PEN IC WITH A REDUCED AMOUNT OF PADS AND A METHOD THEREOF

(71) Applicant: Himax Technologies Limited, Tainan (TW)

(72) Inventors: Guan-Ying Huang, Tainan (TW); Yaw-Guang Chang, Tainan (TW)

(73) Assignee: Himax Technologies Limited, Tainan (TW)

( * ) Notice: Subject to any disclaimer, the term of this patent is extended or adjusted under 35 U.S.C. 154(b) by 13 days.

(21) Appl. No.: 13/936,049

(22) Filed: Jul. 5, 2013

(51) Int. Cl.
*H01L 25/00* (2006.01)
*H01L 27/02* (2006.01)

(52) U.S. Cl.
CPC .................................. *H01L 27/0203* (2013.01)

USPC .......................................................... 327/565

(58) Field of Classification Search
USPC .................................................. 327/564, 565
See application file for complete search history.

(56) References Cited

U.S. PATENT DOCUMENTS 7,277,723 B2 * 10/2007 Wu et al. ..................... 455/550.1
8,797,301 B2 * 8/2014 Ryshtun et al. ............... 345/179

* cited by examiner

*Primary Examiner* — Jeffrey Zweizig
(74) *Attorney, Agent, or Firm* — Donald E. Stout; Stout, Uxa & Buyan, LLP

(57) ABSTRACT

An active pen IC includes a plurality of pads coupled to receive a plurality of receive (RX) signals induced from a mobile device, the received RX signals constituting an original group of RX signals. The active pen IC also includes a permuting unit configured to permute the pads such that the received RX signals corresponding to the permuted pads constitute a generated group of RX signals.

10 Claims, 2 Drawing Sheets

ACTIVE PEN IC WITH A REDUCED AMOUNT OF PADS AND A METHOD THEREOF

BACKGROUND OF THE INVENTION

1. Field of the Invention

The present invention generally relates to an active pen, and more particularly to an active pen IC with a reduced amount of pads.

2. Description of Related Art

An active pen (or pen or stylus) is often used with a mobile device, such as a smart phone, to interact with what is displayed. An active pen adopts an integrated circuit (IC) to process receive (RX) signals induced, for example, from a printed circuit board (PCB). As a resolution or a size of the mobile device is increased, the pads of the active pen IC for receiving the induced signals need be increased accordingly. Therefore, the increased amount of pads substantively occupies precious circuit area.

For the foregoing reasons, a need has arisen to propose a novel scheme to effectively reduce an amount of pads without sacrificing the resolution of the active pen.

SUMMARY OF THE INVENTION

In view of the foregoing, it is an object of the embodiment of the present invention to provide an active pen IC having an amount of pads being substantially less than an amount of pads required in a conventional active pen IC with the same resolution.

According to one embodiment, an active pen IC with a reduced amount of pads includes a plurality of pads and a permuting unit. The pads are coupled to receive a plurality of receive (RX) signals induced from a mobile device, the received RX signals constituting an original group of RX signals. The permuting unit is configured to permute the pads such that the received RX signals corresponding to the permuted pads constitute a generated group of RX signals.

BRIEF DESCRIPTION OF THE DRAWINGS

FIG. 3 shows an exemplary embodiment illustrating relationship between the RX signals and the permuted pads; and FIG. 4 shows another exemplary embodiment illustrating relationship between the RX signals and the permuted pads.

DETAILED DESCRIPTION OF THE INVENTION

Figure 1:
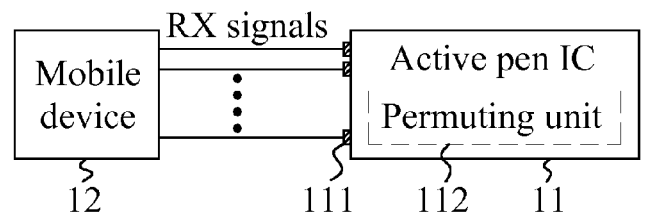
FIG. 1 shows a block diagram illustrative of an active pen integrated circuit (IC) according to one embodiment of the present invention.

FIG. 1 shows a block diagram illustrative of an active pen integrated circuit (IC) 11 according to one embodiment of the present invention. The active pen IC 11 of the embodiment may, for example, be adapted to a mobile device 12 such as a smart phone. The active pen IC 11 of the embodiment may have a reduced amount of pads compared with an active pen IC adapted in a conventional mobile device.

Specifically speaking, the active pen IC 11 has a plurality of pads 111 coupled to receive a plurality of receive (RX) signals, induced from the mobile device 12. An amount of the RX signals is substantially the same as an amount of the pads 111. In the embodiment, the active pen IC 11 includes a permuting unit 112 that is capable of permuting (i.e., changing an order or arrangement of) the pads 111. The permuting unit 112 may be implemented by a combination of software and hardware (e.g., circuitry), such as a processor. Owing to the use of the permuting unit 112 in the embodiment, an amount of the pads 111 (of the active pen IC) may be substantially less than an amount of pads required in a conventional active pen IC with substantially the same resolution or size. Therefore, a substantive circuit area may be saved or a resolution or a size may be increased.

Figure 2A:
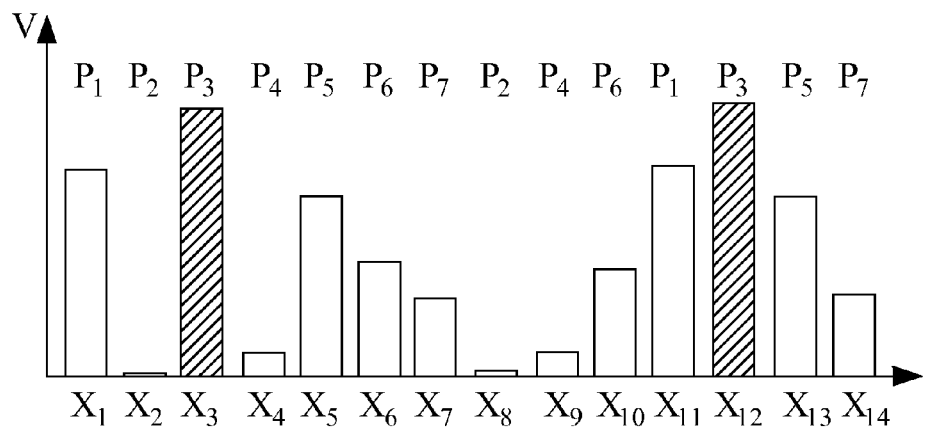
FIG. 2A and FIG. 2B show exemplary RX signals and their corresponding pads.

In one simplified example, the active pen IC 11 has seven pads $P_1$ to $P_7$ that are coupled to receive seven RX signals $X_1$ to $X_7$. The received RX signals $X_1$-$X_7$ constitute an original first group of RX signals, and correspond to the pads $P_1$-$P_7$, respectively. The pads $P_1$-$P_7$ are then permuted by the permuting unit 112, for example, resulting in an order of $P_2$, $P_4$, $P_6$, $P_1$, $P_3$, $P_5$ and $P_7$, which correspond to RX signals $X_8$-$X_{14}$, respectively. The RX signals $X_8$-$X_{14}$ constitute a generated second group of RX signals. FIG. 2A shows exemplary RX signals $X_1$ to $X_{14}$ and their corresponding pads $P_1$ to $P_7$. According to one aspect of the embodiment, the pads 111 are permuted such that a combination of any given pad with its adjacent pads may be different in each group of RX signals (e.g., in the original first group and the generated second group of RX signals).

Figure 2B:
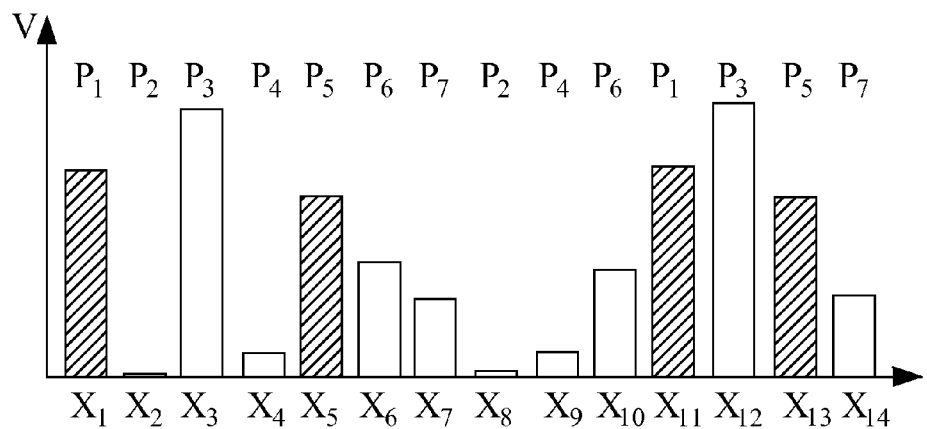

It is observed in FIG. 2A that there are two largest RX signals $X_3$ and $X_{12}$ (i.e., one in the original first group and the other in the generated second group) corresponding to the pad $P_3$. In order to determine a pen point from the two largest RX signals, second and third largest RX signals $X_1/X_{11}$ (corresponding to $P_1$) and $X_5/X_{13}$ (corresponding to $P_5$) should be picked, as shown in FIG. 2B. It is observed in FIG. 2B that the second and third largest RX signals $X_{11}$ and $X_{13}$ and the largest RX signal $X_{12}$ constitute, for example, a normal distribution, in which a signal voltage gradually decreases from the peak value (i.e., $X_{12}$) towards the second largest value (i.e., $X_{11}$) and the third largest value (i.e., $X_{13}$). On the other hand, the second and third largest RX signals $X_1$ and $X_5$ and the largest RX signal $X_3$ do not constitute a normal distribution as a signal voltage does not gradually decrease from the peak value (i.e., $X_3$) towards the second largest value (i.e., $X_1$) and the third largest value (i.e., $X_5$). Accordingly, it is thus determined that the pen point occurs at a position corresponding to the RX signal $X_{12}$.

Figures 3, 4:
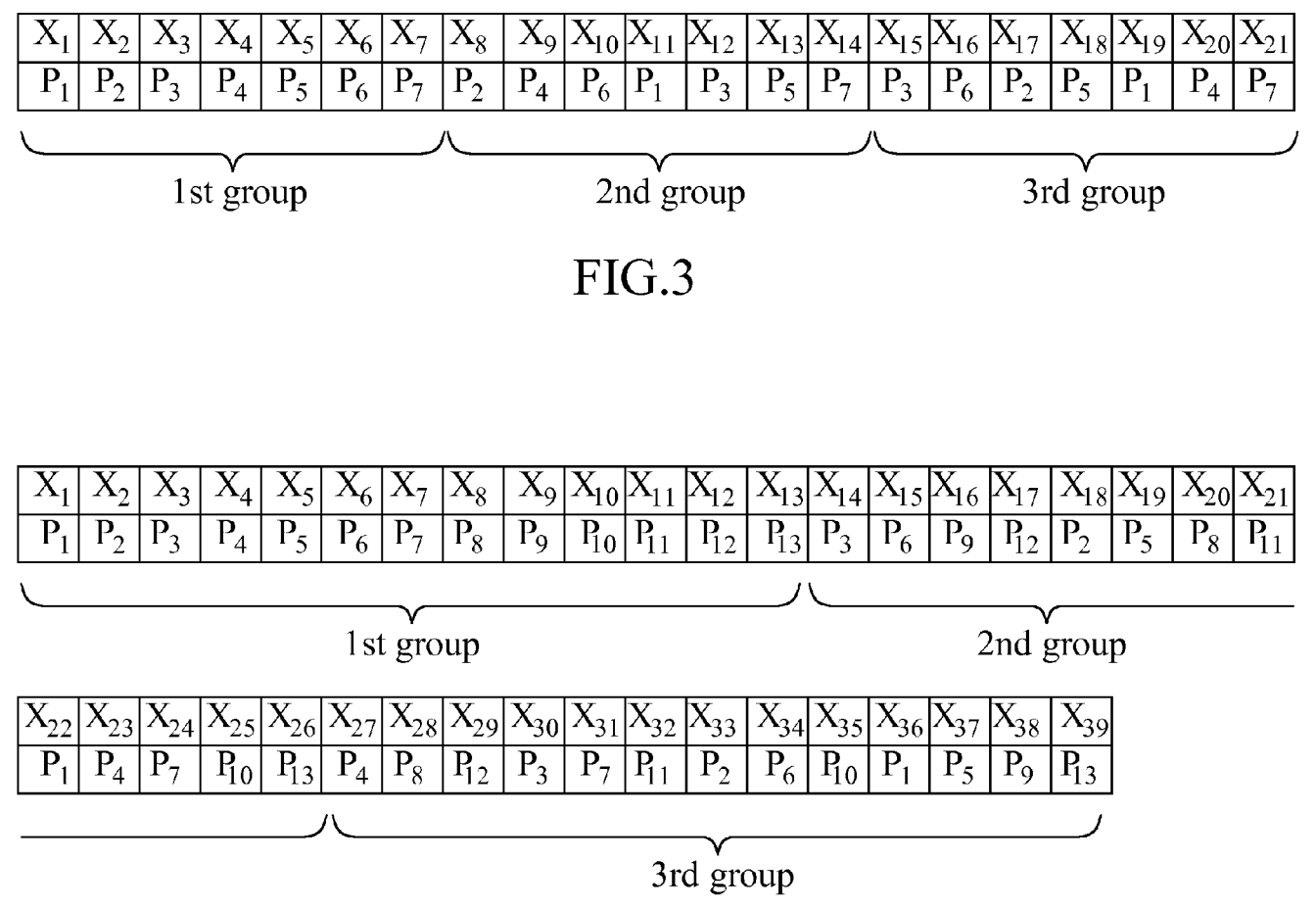

FIG. 3 shows an exemplary embodiment with twenty-one RX signals $X_1$-$X_{21}$ that are resulted from the pads $P_1$-$P_7$, illustrating relationship between the RX signals $X_1$-$X_{21}$ and the permuted pads $P_1$-$P_7$. Specifically, the RX signals $X_1$-$X_7$ received from the mobile device 12 constitute an original first group of RX signals. The pads $P_1$-$P_7$ are then permuted by the permuting unit 112, resulting in an order of $P_2$, $P_4$, $P_6$, $P_1$, $P_3$, $P_5$ and $P_7$, which correspond to RX signals $X_8$-$X_{14}$, respectively. The RX signals $X_8$-$X_{14}$ constitute a generated second group of RX signals. The pads $P_1$-$P_7$ are further permuted by the permuting unit 112, resulting in an order of $P_3$, $P_6$, $P_2$, $P_5$, $P_1$, $P_4$ and $P_7$, which correspond to RX signals $X_{15}$-$X_{21}$, respectively. The RX signals $X_{15}$-$X_{21}$ constitute a generated third group of RX signals.

According to one aspect of the embodiment, as exemplified in FIG. 3, a distance between two adjacent pads in each group is different. For example, a distance between two adjacent pads (e.g., between $P_2$ and $P_3$) in the first group is 1 (=3−2); a distance between two adjacent pads (e.g., between $P_4$ and $P_6$) in the second group is 2 (=6−4), and a distance between two adjacent pads (e.g., between Pa and $P_6$) in the third group is 3 (=6−3). Moreover, any given pad with its adjacent two pads (one to the left and one to the right) may have a different combination in each group. Generally speaking, for N RX signals and B pads (B is preferably a prime integer), N and B have the following relationship: $N=B \cdot [B/2]$, where [ ] is an integer (or Gauss) operator.

FIG. 4 shows another exemplary embodiment with thirty-nine RX signals $X_1$-$X_{39}$ that are resulted from thirteen pads $P_1$-$P_{13}$, illustrating relationship between the RX signals $X_1$-$X_{39}$ and the permuted pads $P_1$-$P_{13}$. Specifically, the RX signals $X_1$-$X_{13}$ received from the mobile device 12 constitute an original first group of RX signals. The pads $P_1$-$P_{13}$ are then permuted by the permuting unit 112, resulting in an order of $P_3$, $P_6$, $P_9$, $P_{12}$, $P_2$, $P_5$, $P_8$, $P_{11}$, $P_1$, $P_4$, $P_7$, $P_{10}$ and $P_{13}$, which correspond to RX signals $X_{14}$-$X_{26}$, respectively. The RX signals $X_{14}$-$X_{26}$ constitute a generated second group of RX signals. The pads $P_1$-$P_{13}$ are further permuted by the permuting unit 112, resulting in an order of $P_4$, $P_8$, $P_{12}$, $P_3$, $P_7$, $P_{11}$, $P_2$, $P_6$, $P_{10}$, $P_1$, $P_5$, $P_9$ and $P_{13}$, which correspond to RX signals $X_{27}$-$X_{39}$, respectively. The RX signals $X_{27}$-$X_{39}$ constitute a generated third group of RX signals.

According to one aspect of the embodiment, as exemplified in FIG. 4, a distance between two adjacent pads in each group is different. For example, a distance between two adjacent pads (e.g., between $P_2$ and $P_3$) in the first group is 1 (=3−2); a distance between two adjacent pads (e.g., between $P_3$ and $P_6$) in the second group is 3 (=6−3), and a distance between two adjacent pads (e.g., between $P_4$ and $P_8$) in the third group is 4 (=8−4). Moreover, any given pad with its adjacent four pads (two to the left and two to the right) may have a different combination in each group. Generally speaking, for N RX signals and B pads (B is preferably a prime integer), N and B have the following relationship: $N=B \cdot [B/4]$, where [ ] is an integer operator.

Although specific embodiments have been illustrated and described, it will be appreciated by those skilled in the art that various modifications may be made without departing from the scope of the present invention, which is intended to be limited solely by the appended claims.

What is claimed is:

1. An active pen IC with a reduced amount of pads, comprising:
    a plurality of pads coupled to receive a plurality of receive (RX) signals induced from a mobile device, the received RX signals constituting an original group of RX signals; and
    a permuting unit configured to permute the pads such that the received RX signals corresponding to the permuted pads constitute a generated group of RX signals.

2. The active pen IC of claim 1, wherein the pads are permuted such that a combination of any given pad with its adjacent pads is different in each group of RX signals.

3. The active pen IC of claim 1, wherein the pads are permuted such that a distance between two adjacent pads in a group of RX signals is different from a distance in another group of RX signals.

4. The active pen IC of claim 3, wherein any given pad with its adjacent two pads in a group of RX signals has a combination different from a combination in another group of RX signals.

5. The active pen IC of claim 3, wherein any given pad with its adjacent four pads in a group of RX signals has a combination different from a combination in another group of RX signals.

6. A method of reducing an amount of pads of an active pen IC, comprising:
    receiving a plurality of receive (RX) signals induced from a mobile device by a plurality of pads, the received RX signals constituting an original group of RX signals; and
    permuting the pads such that the received RX signals corresponding to the permuted pads constitute a generated group of RX signals.

7. The method of claim 6, wherein the pads are permuted such that a combination of any given pad with its adjacent pads is different in each group of RX signals.

8. The method of claim 6, wherein the pads are permuted such that a distance between two adjacent pads in a group of RX signals is different from a distance in another group of RX signals.

9. The method of claim 8, wherein any given pad with its adjacent two pads in a group of RX signals has a combination different from a combination in another group of RX signals.

10. The method of claim 8, wherein any given pad with its adjacent four pads in a group of RX signals has a combination different from a combination in another group of RX signals.

* * * * *